T. H. KANE.
RIBBING AND EXPANDING MACHINE.
APPLICATION FILED JAN. 3, 1910.

968,361.

Patented Aug. 23, 1910.
6 SHEETS—SHEET 1.

Witnesses:
Inventor
Thomas H. Kane
By his Attorney
Edward N. Pagelsen.

T. H. KANE.
RIBBING AND EXPANDING MACHINE.
APPLICATION FILED JAN. 3, 1910.
968,361.
Patented Aug. 23, 1910.
6 SHEETS—SHEET 2.
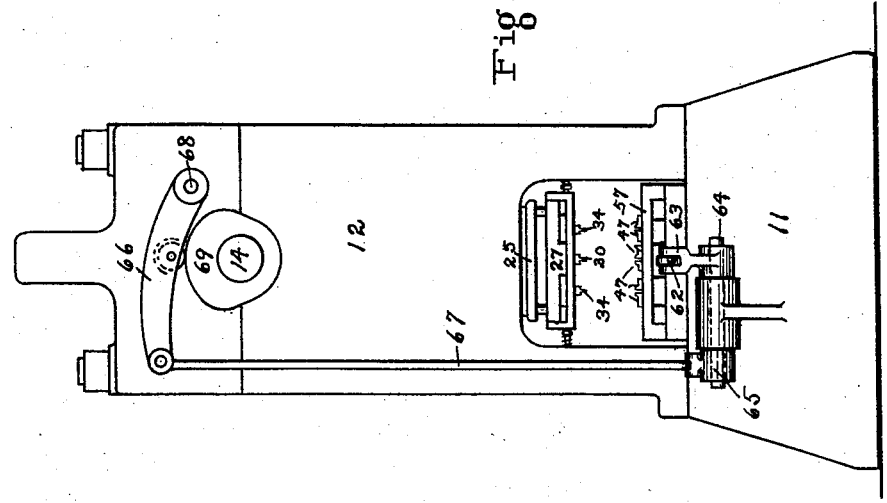
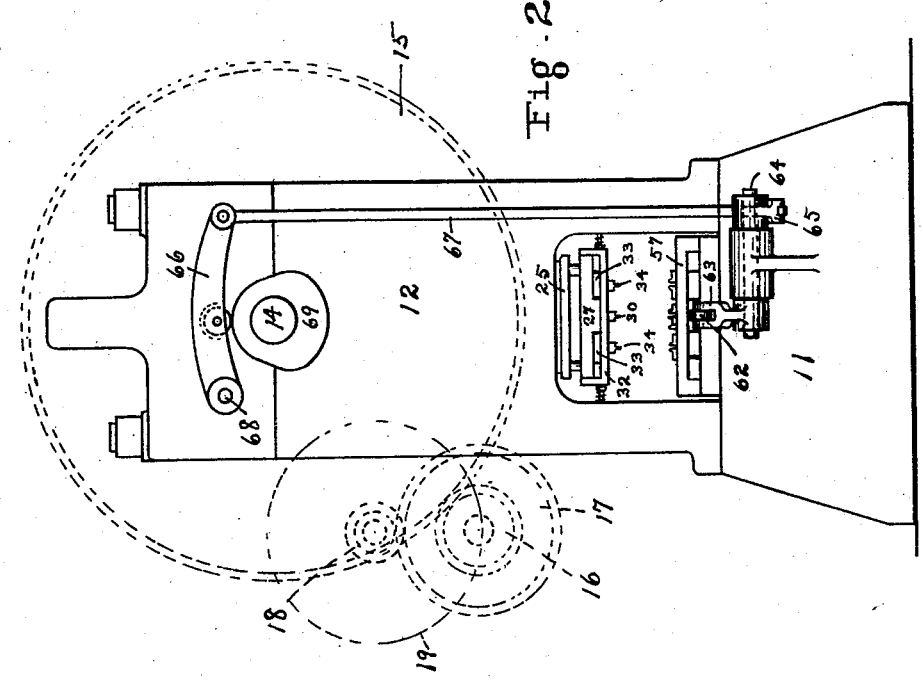
Witnesses:
J. H. Perrult
E. M. Brown
Inventor
Thomas H. Kane.
By his Attorney
Edward N. Pagelsen T. H. KANE.
RIBBING AND EXPANDING MACHINE.
APPLICATION FILED JAN. 3, 1910.
968,361.
Patented Aug. 23, 1910.
6 SHEETS—SHEET 3.
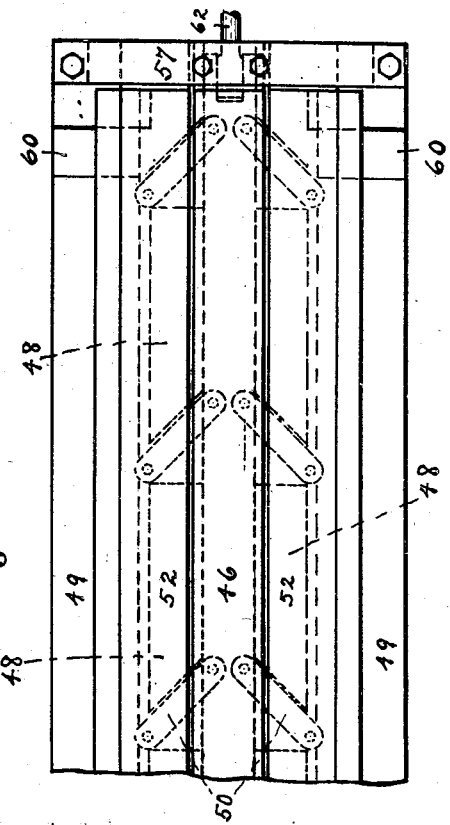
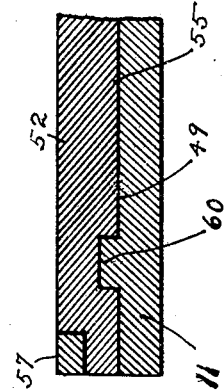
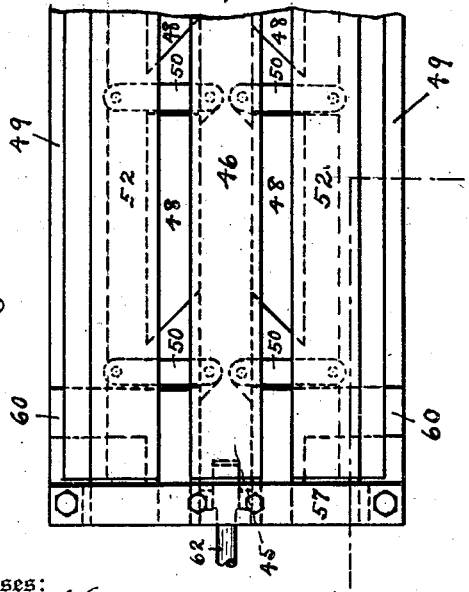
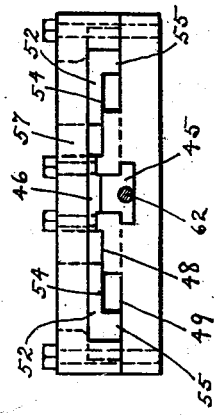
Witnesses:
J. H. Perrault
E. M. Brown
Inventor
Thomas H. Kane.
By his Attorney
Edward N. Pagelsen.

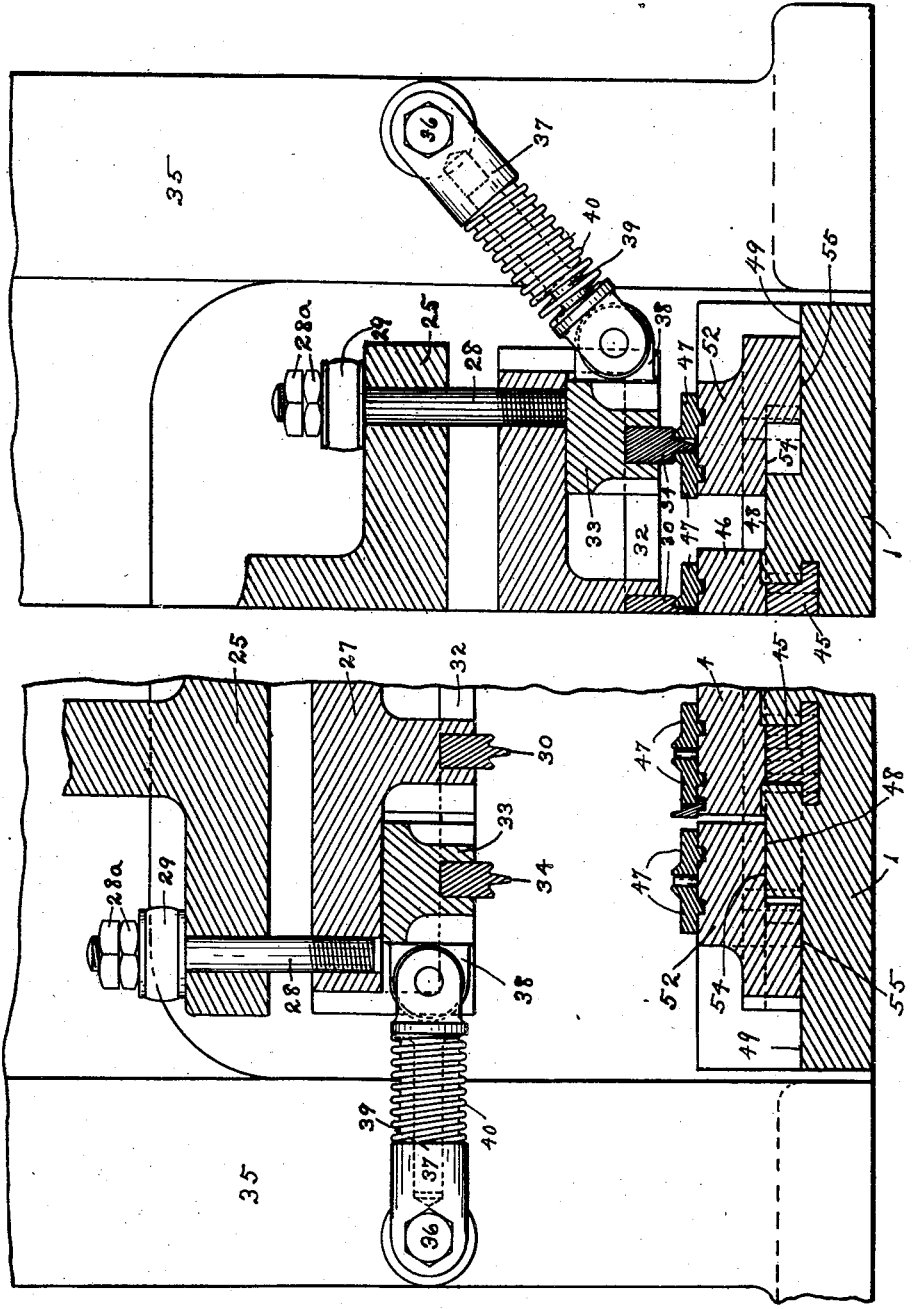

T. H. KANE.
RIBBING AND EXPANDING MACHINE.
APPLICATION FILED JAN. 3, 1910.
968,361.
Patented Aug. 23, 1910.
6 SHEETS—SHEET 5.
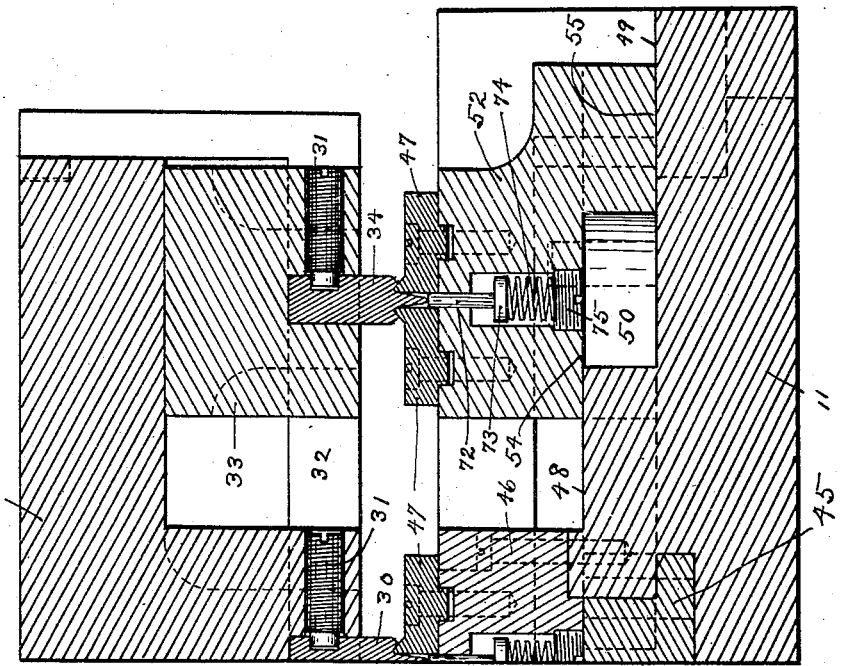

T. H. KANE.
RIBBING AND EXPANDING MACHINE.
APPLICATION FILED JAN. 3, 1910.

968,361.

Patented Aug. 23, 1910.
6 SHEETS—SHEET 6.

Witnesses:
J. H. Perrault
E. M. Brown

Inventor
Thomas H. Kane
By his Attorney
Edward N. Pagelsen.

UNITED STATES PATENT OFFICE.

THOMAS HENRY KANE, OF YOUNGSTOWN, OHIO, ASSIGNOR TO TRUSSED CONCRETE STEEL COMPANY, OF DETROIT, MICHIGAN, A CORPORATION OF MICHIGAN.

RIBBING AND EXPANDING MACHINE.

968,361. Specification of Letters Patent. Patented Aug. 23, 1910.

Application filed January 3, 1910. Serial No. 535,930.

*To all whom it may concern:*

Be it known that I, THOMAS H. KANE, a citizen of the United States, and a resident of Youngstown, in the county of Mahoning and State of Ohio, have invented a new and Improved Ribbing and Expanding Machine, of which the following is a specification.

This invention relates to machines for expanding slitted sheet-metal to form metal lath, and the object of my improvements is to provide an expanding-machine which is adapted to form ribs on properly slitted sheet metal and at the same time partially expanding the slitted portions, and then by another operation of the machine continuing the expansion until the desired amount of expansion is obtained.

Figure 1:
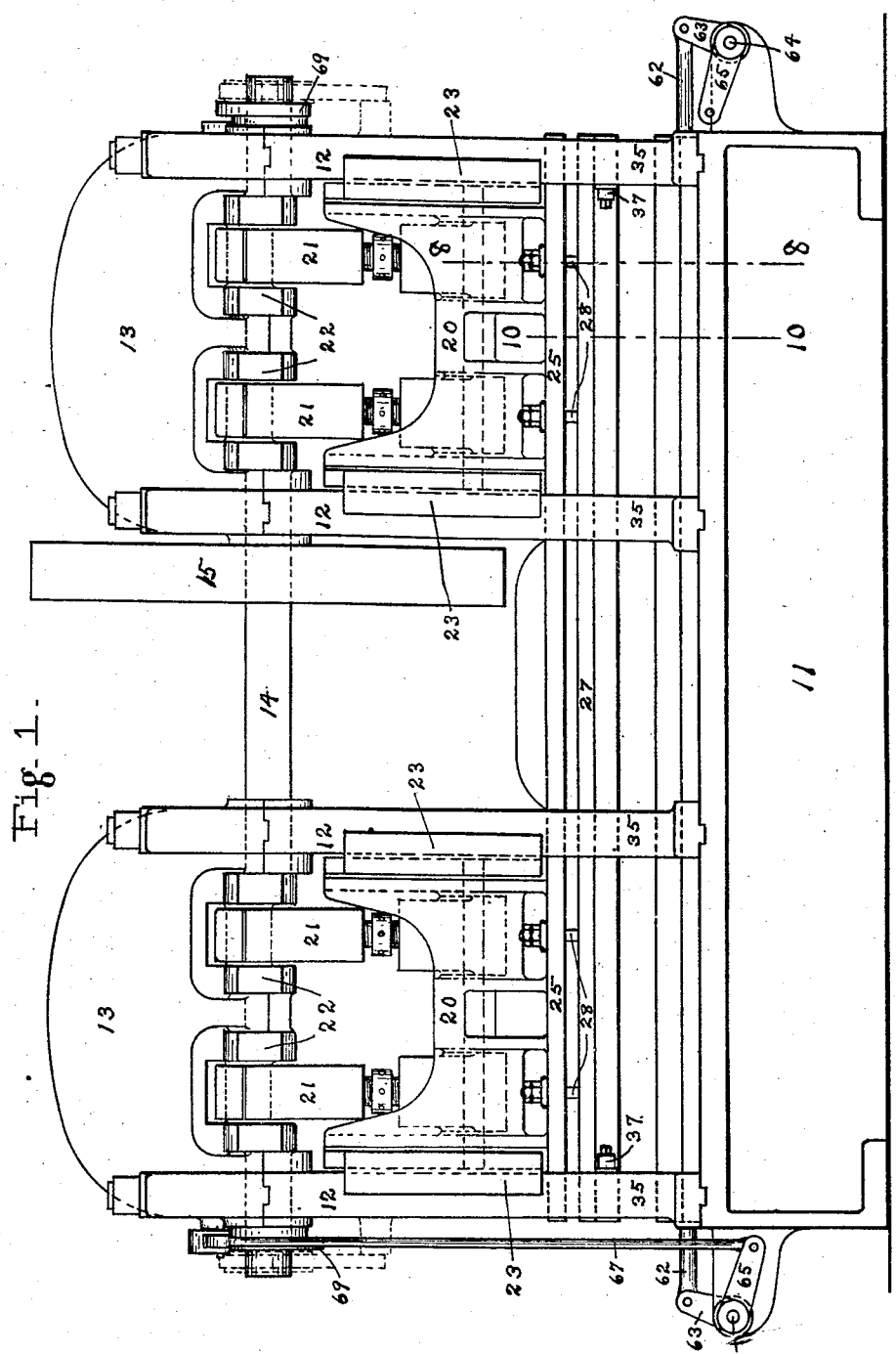
Figure 12:
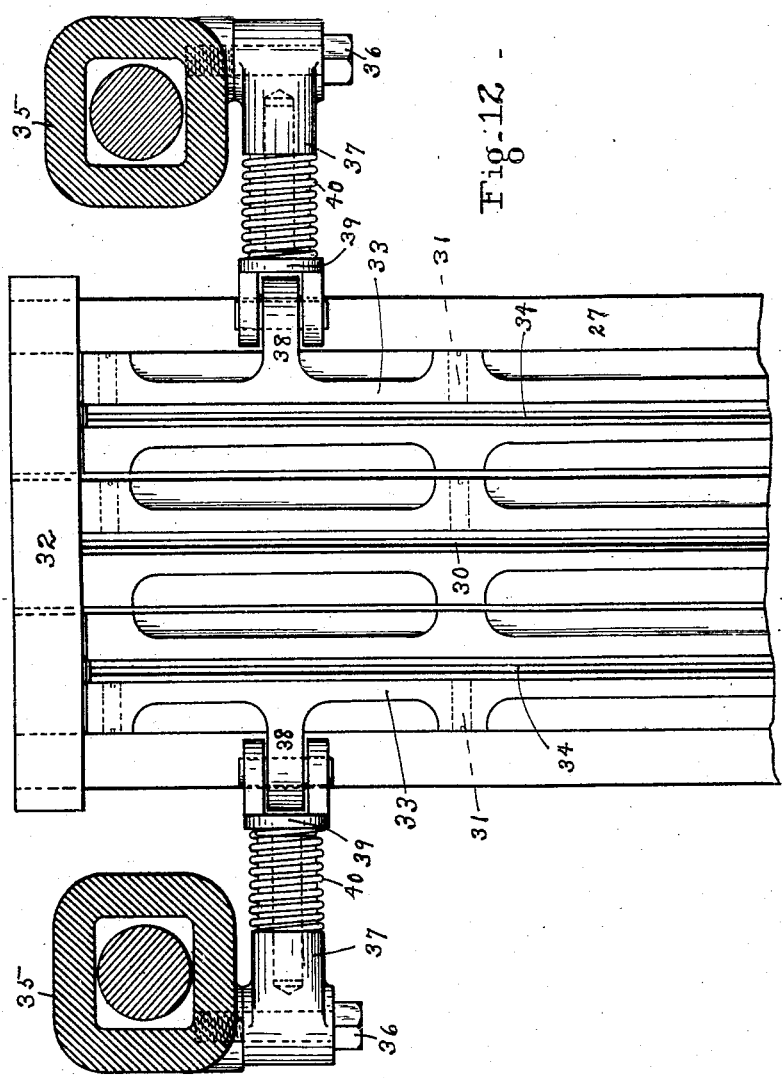

In the accompanying drawings, Figure 1 is a front elevation, Fig. 2 is an elevation of the left end and Fig. 3 is an elevation of the right end of the machine. Fig. 4 is a plan of one end of the lower dies when in separated positions and Fig. 5 is a plan of the other end of said dies when in normal position. Fig. 6 is an end view of the same. Fig. 7 is a vertical cross section on the line 7—7 of Fig. 4. Fig. 8 is a partial cross section on the line 8—8 of Fig. 1 showing the dies in normal position and Fig. 9 is a partial cross section of the same line showing the dies separated laterally. Figs. 10 and 11 are similar partial cross sections on the line 10—10 of Fig. 1. Fig. 12 is a bottom plan of the upper dies and the returning mechanism.

Similar reference characters refer to like parts throughout the several views.

In my Patent No. 920,152, dated May 4th, 1909, a process is described for expanding slitted sheet metal by ribbing the same; which process consists in forming a portion of the sheet into stiffening ribs or beams while the outer edges of the sheet are prevented from moving toward each other, the result being, that the width of the material necessary to form these ribs or beams is provided by expanding the slitted portions of the sheet. In this process of the patent, the amount of metal given to the ribs or beams will always be equal to the amount of expansion of the slitted portions.

It is often desirable that the slitted portions of the sheet be expanded a greater amount than will be possible by the patented process alone. This may be done by first partially expanding the slitted sheet and then forming the ribs and thus completing the expansion, which method is described in the Kahn Patent No. 943,417 dated Dec. 14th 1909. A second method consists in first partially expanding the slitted portions of the sheet by grooving or ribbing, and then completing the expansion by separating the ribs laterally. This last method is carried out by the machine embodying the present invention and explained as follows.

In the accompanying drawings, 11 is the base of the machine upon which are mounted the uprights 12, in pairs, each pair connected by means of a cross-piece 13. A main shaft 14 is mounted in the uprights and may be driven in any desired manner, as by the gears 15, 16, 17 and 18 and pulleys 19, indicated in dotted lines in Fig. 2. As this mechanism is well known, it may be merely stated that the two heads 20 are provided with links 21 to connect them to the cranks 22 of the main shaft so the heads may slide up and down between the guides 23. Any desirable stop may be employed to check the machine at the end of each revolution of the main shaft. One well known in the art of sheet metal punching is shown in dotted lines at each end of the main shaft. The heads 20 are connected by a main head plate 25 which forms a part of the present invention. All the other mechanism above described is well known and may be replaced by any other which will cause the head plate 25 to move up and down at the will of the operator.

Mounted on the base 11 are the female dies, while carried by the head plate 25 is a die-carrier plate 27 on which are mounted the male dies, the corresponding male and female dies forming pairs, and the outer pairs movable laterally from the center line of the machine. While three pairs of dies are shown, it will be apparent that any pair can be omitted without interfering with the operation of the other pairs.

The plate 25 is provided with a series of vertical holes in which the bolts 28 are vertically movable. The lower ends of these bolts are secured in the die-carrier 27, while on the upper ends are the nuts 28ª and cushion washers 29. It will be seen that after the plate 20 and the die-carrier 27 have reached their lower position (Fig. 9) the die-carrier may remain in this position for some time after the head-plate 25 has begun to rise. It is during this period that the additional expansion takes place.

The die-carrier 27 is provided with a central longitudinal groove in its lower face in which the central male die-member 30 is mounted, being held in position by set-screws 31. Yokes 32 extend around the ends of the die-carrier to form supports for the ends of the holders 33 of the other male die-members 34. These die-members are also held in their grooves by means of set-screws 31.

As will be explained farther on, the male dies descend and force the sheet metal into the female dies, after which the pairs of dies are separated laterally. The male dies then ascend, during which time it is desirable that they should return to normal position. To accomplish this, the following described mechanism may be employed. On the inside of legs 35 of the uprights 12 are mounted pins 36 on which are pivoted the sleeves 37. Projecting laterally from the holders 33 are lugs 38 to which are pivoted the pins 39 which are slidable in the sleeves 37. Springs 40 on these sleeves engage shoulders on the pins 39 and the sleeves 37. When the die carrier moves down from the position shown in Fig. 8, the pin 39 slides out of the sleeve 37 and the spring 40 looses its tension, there being thus no pull to move the holder 33 out laterally. After the dies have been moved to the position shown in Fig. 9, and the expanding of the sheet metal is completed, the die carrier rises to the position shown in Fig. 8, during which time the springs 40 will force the holders 33 back to normal position.

As before stated, the lower or female dies are in normal position during the forming of the ribs on the slitted metal, and are then separated laterally to expand the slitted portions of the sheets still farther. The lower dies are mounted on the upper surface of the base which base is grooved to receive the longitudinally movable bar 45 which is so connected to a portion of the lower dies that the dies will move away and toward the central line of the machine as the bar slides forward and back. Above the groove in which this bar is mounted is secured the central die-holder 46, to the top of which are secured the half-die members 47. Each lower die is formed of such two members.

The top of the base 11 is formed preferably with the inner steps or levels 48, and the side steps or levels 49. The levels 48 are not continuous but are in the form of short separated portions with spaces between them in which the toggle-links 50 may move. (See Fig. 4.) These links connect to the movable bar 45 by means of pins 51 and to the die-carriers 52 by means of the pins 53. These die-carriers 52 are formed with two steps 54 and 55 which rest respectively on the levels 48 and 49. The reason for forming these parts with steps or levels is that the machining of the parts is thereby simplified. The ends of the carriers 52 are reduced and are slidable under the yokes 57, as shown in Figs. 4, 5 and 6.

The dies are omitted in Figs. 4 to 7 inclusive for the sake of clearness, but the method of mounting them is clearly shown in Figs. 10 and 11. Fig. 5 shows the bar 45 in its withdrawn position, that is, farthest to the right. The die-carriers 52 are in normal or "unseparated" position. By moving the bar 45 to the left, to the position shown in Fig. 4, the die-carriers 52 are forced apart by the toggle-links 50. The die-carriers are formed with transverse grooves in which the ribs 60 on the base 11 engage as shown in Figs. 4, 5 and 7. This device prevents the die-carriers from moving endwise because of the thrust or pull of the toggle-links.

At each end of the bar 45 is a rod 62 which connects by means of pin and slot connection to cranks 63 on a shaft 64. On each shaft 64 is a second crank 65, which connects to a lever 66 by means of a link 67. Each lever 66 is mounted on a pin 68 extending from the end 12, and each lever rests on a cam 69 on the shaft 14. The cams are so positioned that the levers 66 will always move in opposite directions, and especially positioned that the bar 45 will be pulled toward the left, and all the parts assume the position shown in Figs. 4, 9 and 11 while the heads 20 and main plate 25 begin their upward movement. The dies return to normal position through the action of the cam at the right end of the press just as the upper dies begin their downward stroke, the bar 45, the toggle-links and the die-carriers going to the positions shown in Fig. 5.

The usual refinements in press manufacture may be employed. Thus the ribbed metal may be lifted from the lower dies by means of plungers formed with stems 72 and heads 73, as shown in Figs. 10 and 11, which plungers are pushed up by the light springs 74. The heads and springs are in bores in the die-carriers, the springs being adjustable by the screws 75. Many changes in the details of the actuating mechanism and in the construction of the dies may be made by those skilled in the art without departing from the spirit of my invention.

Having now explained my construction, what I claim as my invention and desire to secure by Letters Patent is:—

1. In a machine for ribbing and expanding slitted sheet metal, the combination of a plurality of pairs of dies for ribbing the metal, means for operating the dies, and means for separating the pairs of dies.

2. In a machine for ribbing and expanding slitted sheet metal, the combination of a plurality of pairs of dies, each pair comprising upper and lower members, means for forcing said members into engagement to form ribs on the sheet metal, and means to separate the pairs of dies to expand the sheet metal.

3. In a machine for ribbing and expanding slitted sheet metal, the combination of a base, dies mounted thereon, means to move said dies laterally from and toward each other, a vertically reciprocating head, and dies mounted thereon adapted to co-act with the other dies to form ribs on the sheet metal.

4. In a machine for ribbing and expanding sheet metal, the combination of a base, a bar slidable in the same, die-carriers mounted on the base, links connected to said bar and to one of the die-carriers so that longitudinal movement of the bar will cause lateral movement of the die-carrier, dies mounted on the carriers, a vertically movable head, dies carried thereby, and means for reciprocating said head and said slidable bar to cause the dies to rib and expand the sheet metal.

5. In a machine for ribbing and expanding slitted sheet metal, the combination of a plurality of lower dies and means to move the same laterally from and toward each other, a die carrier, upper dies mounted thereon, means to move the upper dies into engagement with the lower dies before the lower dies are separated and to move them out of engagement after such separation, and means to return the upper dies to normal position.

6. In a machine for ribbing and expanding slitted sheet metal, the combination of pairs of dies for forming ribs along the edges of the sheet metal, means to actuate the same to form said ribs, and means to move said pairs of dies at an angle to the first movement to expand the slitted sheet.

7. In a machine for ribbing and expanding slitted sheet metal, the combination of pairs of dies, means for moving the members of each pair relative to each other for forming ribs on the sheet metal parallel to each other, and means for separating said ribs in a plane at an angle to the first movement to expand the slitted metal.

8. In a machine for ribbing and expanding slitted sheet metal, the combination of stationary and movable pairs of dies for forming ribs on the sheet metal parallel to each other, one die member of the movable pair being movable in two planes and the other member in but one plane, and means for moving one pair laterally to expand the slitted metal.

9. In a machine for ribbing and expanding slitted sheet metal, the combination of a plurality of pairs of movable dies and a stationary pair of dies between them for forming ribs on the sheet metal, and means for moving the two outer pairs laterally from the inner pair.

10. In a machine for ribbing and expanding sheet metal, the combination of laterally movable lower dies and a stationary lower die between them, means to separate the dies, a die carrier and upper dies mounted thereon, means to move the upper dies into engagement with the lower dies before the lower dies are separated, and to move the dies out of engagement after such separation, and means to return the dies to normal position.

11. In a machine for ribbing and expanding sheet metal, the combination of a base, a plurality of dies mounted thereon, means to slide the dies laterally from and toward each other, frames mounted on the bed, and comprising tops and legs, vertically and laterally movable dies between said legs, means to move said dies into and out of engagement with the dies on the base, and means mounted on the frames to laterally move the upper dies back to normal position.

In testimony whereof I have signed this specification in the presence of two subscribing witnesses.

THOMAS HENRY KANE.

Witnesses:
T. J. PADDON,
W. H. BUEHLER.